UNITED STATES PATENT OFFICE.

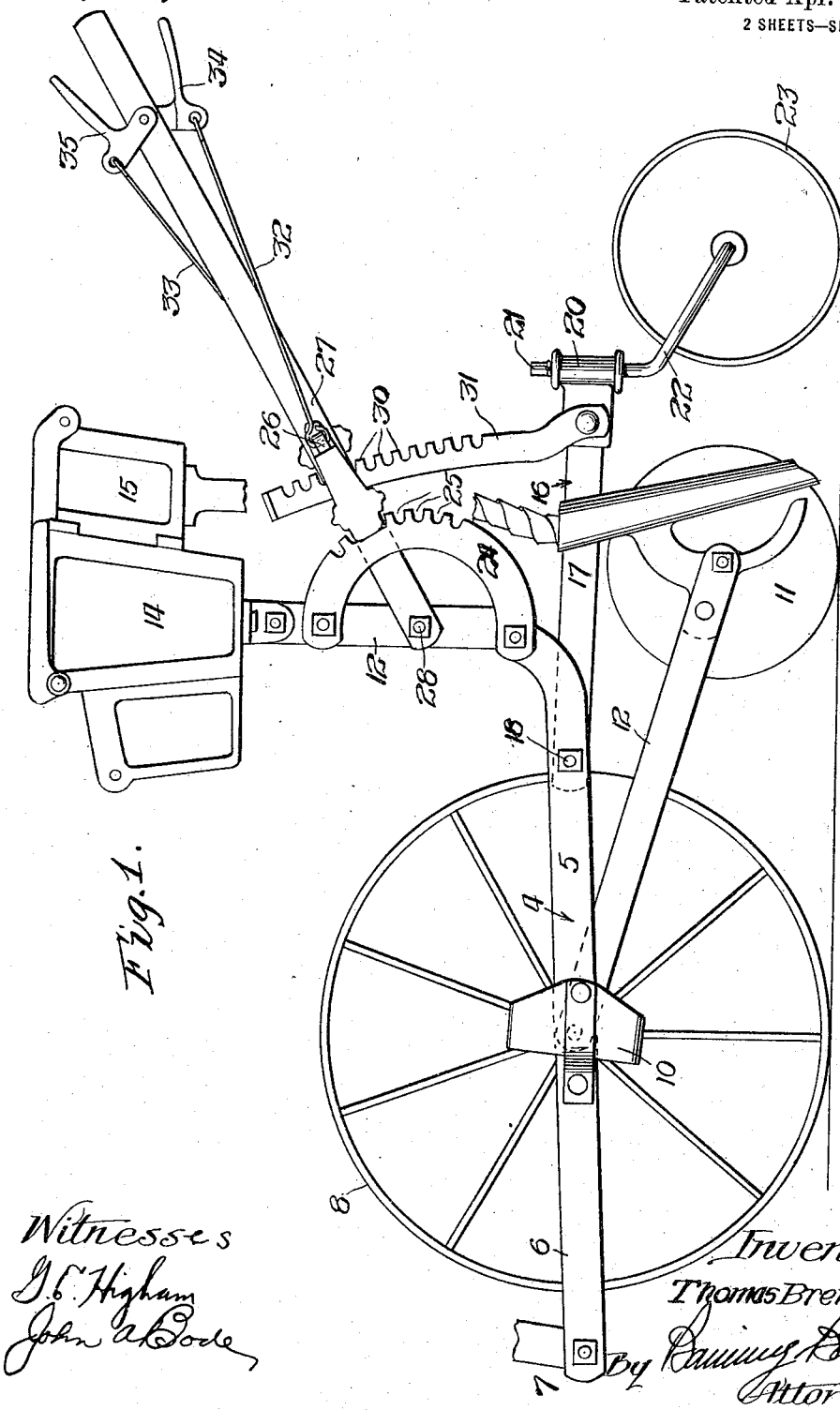

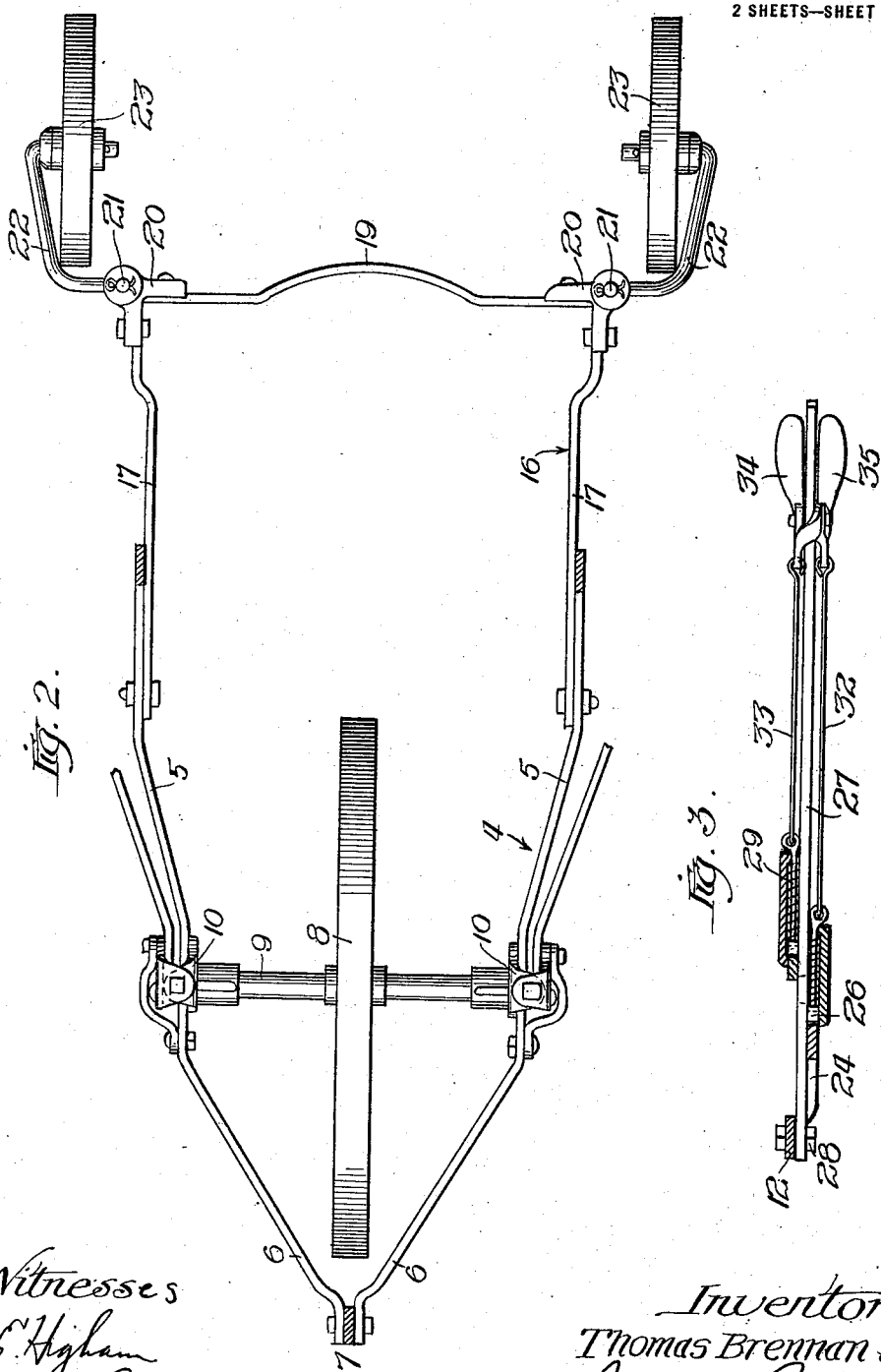

THOMAS BRENNAN, JR., OF MOLINE, ILLINOIS, ASSIGNOR TO MONITOR DRILL COMPANY, OF MINNEAPOLIS, MINNESOTA, A CORPORATION OF MINNESOTA.

GRAIN-DRILL.

1,223,142.          Specification of Letters Patent.          Patented Apr. 17, 1917.

Application filed May 6, 1915. Serial No. 26,313.

*To all whom it may concern:*

Be it known that I, THOMAS BRENNAN, Jr., a citizen of the United States, residing at Moline, in the county of Rock Island and State of Illinois, have invented certain new and useful Improvements in Grain-Drills, of which the following is a specification.

This invention relates primarily to the means afforded for regulating the height of the furrow openers in implements of the character known in the trade as five-disk drills, which type of drill is one provided with a front carrying wheel and rear caster wheels supporting a hinged or articulated frame-work, which can be adjusted up and down at the joint to raise and lower the furrow openers. Although the adjusting mechanism is designed particularly for use in connection with this type of grain drills, it is not the intention that the claims be strictly limited to this type, unless otherwise specified.

The object of the invention is to facilitate the vertical adjustment of the furrow openers which are ordinarily raised and lowered to a limited extent during the operation of the machine in the field, and raised to a considerably higher level when it is desired to transport the machine across the field or on the road.

In implements of the existing type, hand levers are ordinarily so arranged as to afford the necessary leverage for regulating the depth of the furrow openers while in operation, but are ill-designed to afford the necessary leverage to enable the operator to raise the furrow openers to the extreme limit required in transporting the machine. The present invention is designed to overcome this difficulty, and to afford means for so regulating the levers that the machine can be readily adjusted to the required degree to meet all conditions encountered.

Further objects will appear from a detailed description of the invention which consists in the features of construction and combinations of parts hereinafter described and claimed.

In the drawings:

Figure 1 is a side elevation of a five-disk drill embodying the features of the present invention;

Fig. 2 is a plan view of the frame and supporting wheels with the superstructure cut away; and Fig. 3 is a detail of one of the adjusting levers.

The implement in the form shown is supported or built upon a main frame 4 comprising a pair of side rails 5, the front ends 6 of which converge together and are connected at the point 7 which constitutes the front end of the machine. Between the side rails is located a front carrying wheel 8 mounted upon an axle 9 which is journaled in bearings 10 supported by the side rails of the frame. A plurality of disk furrow openers 11 are provided, which trail behind drag bars 12 suitably connected at their forward ends to the frame in any suitable, conventional manner.

In implements of the type illustrated, it is customary to employ five-disk furrow openers, although obviously the number may be varied if desired. The furrow opening and seed depositing features of the invention are conventionally shown, and may be of any well-known construction. The side rails of the frame at their rear ends are upturned to form standards 13 which support the seed and fertilizer boxes 14 and 15 respectively, although obviously the fertilizer attachment may be omitted.

The invention resides in the novel features and combinations now to be described. The main frame has connected thereto a rear supporting frame 16 comprising side rails 17 hinged or pivoted at their forward ends by means of pivot bolts 18 to the side rails of the main frame. The side rails 17 of the supporting frame are connected at their rear ends by a rear cross rail 19 provided at its rear outer corners with caster sockets 20 which serve to swivel the upturned ends 21 of a pair of caster wheel supports 22, each of which carries a caster wheel 23.

Each of the standards 12 of the main frame is provided with a segmental rack 24 having teeth 25, which teeth coöperate with a plunger bolt 26 slidably mounted upon a hand lever 27 pivoted at its forward end at a point coincident with the center of curvature of the rack by means of a pivot bolt 28. The hand lever on its opposite side is provided with a similar plunger bolt 29, which coöperates with the teeth 30 of an upstanding rack bar 31 rigidly connected at its lower end to the corresponding rail of the rear supporting frame near the rear end thereof. The plunger bolts 26 and 29 are operated by draw rods 32 and 33 respectively, operated by grip levers 34 and 35 respectively, pivoted near the rear or gripping end of the hand lever 27. It will be understood that the parts mentioned are duplicated on each side of the machine, and description of one applies to both.

In adjusting the hand levers for use in the field, the operator can lock the lever to the main frame by dropping the plunger bolt into one of the upper notches of the rack segment 24 regulating the height of the levers to conform most perfectly with the physique of the operator. Thereafter the adjustments can be readily effected when desired by unlocking the levers from the upstanding racks 31, and lifting the front portion of the machine by a direct upward pull on the hand levers, which should be adjusted to occupy the position best fitted to allow of such lifting movement, which ordinarily will be of limited extent. As the levers are lifted, the furrow openers will be raised and the frame will hinge or double up on the pivot bolts 18 until the desired elevation is secured, after which the plunger bolts 29 can be released to engage the teeth of the upstanding racks 31 and the parts rigidly locked together.

When it is desired to lift the furrow openers entirely clear of the ground, and to impart a greater degree of lifting movement to the main frame than could be conveniently secured with the levers locked to the segmental racks 24 at the points previously stated, this result can be readily secured by unlocking the levers from both racks and throwing them down to a position where the plunger bolt 26 will engage with the lowermost notches of the segmental rack. This will bring the gripping ends of the hand levers to a relatively low position, so that the operator may, without any inconvenience, lift the levers to a very much greater extent than could be easily done if the lifting levers initially occupied relatively high positions. Of course, after the levers have been lifted to the point desired, the parts can be locked by releasing the plunger bolts 29 to engage with the rack bars 31 which will hold the parts in locked position with the frame doubled up at the joint and the disks elevated high above the ground level.

It will be seen from the foregoing description that, by providing two rack bars on each side and a lever adapted for adjustment to different positions on each rack bar, the capacity of the levers for effecting a convenient adjustment is greatly increased, and that the machine is one which readily adapts itself to the physical requirements of individual operators which is a matter of major importance when regard is had for the strain and fatigue which might be occasioned in cases where the levers were fixedly located at points inconvenient of manipulation to the individual operator. Furthermore, the operation is considered to be more convenient and satisfactory than is the case with certain prior types of construction in which the levers were pivoted to standards or supports mounted upon the supplemental frame and the lifting operation effected, as in the case of levers in the first order, by a down thrust of the free lever ends. A direct lifting action is secured, and the necessity for affording fulcrum points for the operation of the levers is obviated, the rack bars 30 serving merely as locking elements for retaining the parts in adjusted position and subserving no function during the period of actual adjustment.

I claim:

1. A tillage implement provided with an articulated frame, tillage devices carried by one of the members of the frame, a hand lever pivoted to the member of the frame which carries the tillage devices, of locking means for holding the lever in a selected position of angular adjustment with respect to the frame to which it is pivoted to permit of a lifting of said frame section and tillage devices by a lifting movement of the lever, and locking means on the other section of the frame for holding the lever at different positions of vertical elevation, substantially as described.

2. A tillage implement provided with an articulated frame, tillage devices secured to one of the sections of the frame, supporting wheels for each of the sections of the frame, a hand lever pivoted to the section of the frame which carries the tillage devices, locking means for holding the hand lever in different positions of angular adjustment with respect to the frame section to which the lever is pivoted to permit of a lifting of said frame section and tillage devices by a lifting movement of the lever, and locking means on the other section of the frame for holding the lever in different positions of vertical elevation, substantially as described.

3. In an implement of the class described, an articulated frame consisting of front and rear sections pivoted together, furrow openers carried by the front section, a carrying wheel journaled to the front section, a lever pivoted to the front section, a rack segment secured to the front section, locking means on the lever for engaging with the rack to hold the lever in different positions of angular adjustment with respect to the front frame section, to permit of a lifting of said section and tillage devices by a lifting movement of the lever supporting wheels on the rear frame section, a rack secured to the rear frame section, and locking means on the lever for engaging with the rack to hold the lever in different positions of vertical elevation, substantially as described.

4. In an implement of the class described, the combination of a front frame section consisting of side rails terminating at the rear ends in supporting standards, seeding mechanism carried by the standards, a lever pivoted to each of the standards, locking means for each lever for holding the same in a selected position of angular adjustment with respect to its standard to permit of a lifting movement of the front frame and associated parts by a lifting movement of the lever, a rear frame pivoted to the front frame, supporting wheels for the rear frame, and means coöperating with each of the levers for holding the lever in selected positions of vertical elevation, substantially as described.

5. In an implement of the class described, the combination of a front frame section consisting of side rails terminating at the rear ends in supporting standards, seeding mechanism carried by the standards, a lever pivoted to each of the standards, locking means for each lever for holding the same in a selected position of angular adjustment with respect to its standard to permit of a lifting movement of the front frame and associated parts by a lifting movement of the lever, a rear frame pivoted to the front frame, supporting wheels for the rear frame, a rack for each lever, upstanding from the rear frame, and locking means on each of the levers for engaging with the corresponding rack for holding the levers in selected positions of vertical elevation, substantially as described.

6. In an implement of the class described, the combination of a front frame comprising side rails connected at their forward ends, and each teminating at its rear end in an upstanding support, seeding mechanism carried by the supports, a rear frame comprising a cross rail and side rails pivoted at their forward ends to the front frame, a carrying wheel journaled between the side rails of the front frame, a pair of caster wheels swiveled to the rear frame, a pair of adjusting levers pivoted to the upstanding supports on the front frame, a segmental rack for each lever carried by the support to which the lever is pivoted, a lock carried by each lever and adapted to engage with its rack for holding the lever in selected positions of angular adjustment with respect to the front frame to permit of a lifting movement of the front frame and associated parts by a lifting movement of the lever, a rack for each of the levers rigidly secured to and upstanding from the rear frame, and a locking device on each of the levers adapted to co-act with the last mentioned rack for holding the levers in selected positions of vertical adjustment, substantially as described.

THOMAS BRENNAN, Jr.

Witnesses:
L. C. BLANDING,
JAMES J. LAMB.

Copies of this patent may be obtained for five cents each, by addressing the "Commissioner of Patents, Washington, D. C."